United States Patent [19]

Rudd

[11] 3,918,094

[45] Nov. 4, 1975

[54] TEACHING DEVICE EMPLOYING MAGNETIC TAPE WITH LEGENDS AND CONTAINED IN A SPECIAL CASSETTE

[76] Inventor: Adrian Francis Rudd, 29 Bar Lane, Stapleford, Cambridge, England

[22] Filed: May 21, 1974

[21] Appl. No.: 471,981

[30] Foreign Application Priority Data

May 29, 1973 United Kingdom .............. 25421/73

[52] U.S. Cl. .................... 360/96; 35/35 C; 360/132

[51] Int. Cl. ................. G11B 23/38, G11B 23/44, G11B 15/60, G11B 23/04

[58] Field of Search ............ 360/1, 2, 96, 131, 132, 360/134, 137; 35/35 C

[56] References Cited

UNITED STATES PATENTS

| | | | |
|---|---|---|---|
| 2,849,542 | 8/1958 | Macchesney | 35/35 C |
| 3,176,927 | 4/1955 | Irazoqui | 35/35 C |
| 3,255,537 | 6/1966 | Cole et al. | 35/35 C |
| 3,363,330 | 1/1968 | Kobler | 35/35 C |
| 3,369,307 | 2/1968 | Shupp | 35/35 C |
| 3,416,241 | 12/1968 | Weitzner | 35/35 C |

*Primary Examiner*—Alfred H. Eddleman
*Attorney, Agent, or Firm*—Oblon, Fisher, Spivak, McClelland & Maier

[57] ABSTRACT

A magnetic recording tape has legends applied to the rear, non-magnetised surface thereof, the legends corresponding to recorded information on the tape. The tape is contained in a special cassette and a window is provided in the cassette to allow the printed legends to be seen. The spacing between legends and recorded information is made equal to that required for the printed legends corresponding to the information being replayed at any instant to just be visible in the window.

A sliding cover is provided for the window.

The tape in the cassette is twisted so as to present a 45° surface below the window, for viewing.

8 Claims, 7 Drawing Figures

Figure 1:
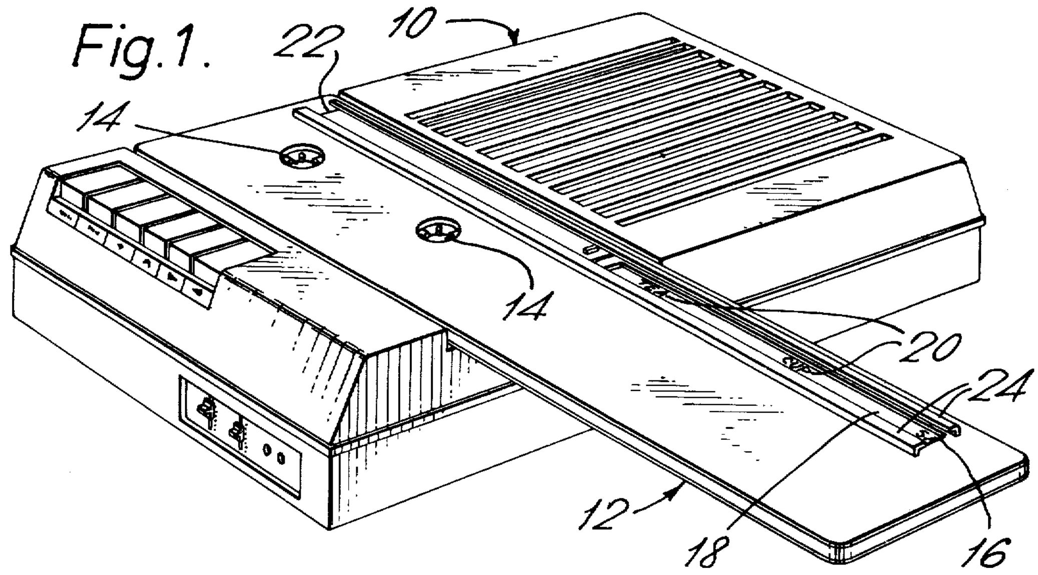

TEACHING DEVICE EMPLOYING MAGNETIIC TAPE WITH LEGENDS AND CONTAINED IN A SPECIAL CASSETTE

This invention concerns teaching aids employing magnetic tape recordings and in particular to an improved magnetic tape having a pre-recorded lesson thereon and devices for re-playing same.

It has also been proposed to apply legends and characters to a magnetic recording tape.

It is an object of the present invention to provide a teaching aid employing printed and prerecorded magnetic recording tape in which the printed information is visible in synchronism with the reproduced recorded sounds during replay in which the tape is housed in a convenient form for storage and replay by unmodified magnetic recording and replay equipment.

According to the present invention there is provided a magnetic recording tape having audio information recorded thereon and having applied to one side thereof legends corresponding to the recorded information for visually representing the information as the sounds thereon are heard during playback, a cassette, two reels within the cassette for containing and taking up the tape respectively, the two reels being sandwiched between upper and lower housing walls, at least one window formed in the upper housing wall and guide means in the housing for causing the tape to be stretched below the window whereby the legends on the tape can be seen through the window as they pass therebelow during transition of the tape from one reel to the other.

According to the present invention a magnetic recording tape having audio information recorded thereon has applied to one side thereof legends corresponding to the recorded information for visually representing the information as the sounds thereof are heard during play-back.

The audio information may comprise for example the letters of the alphabet, words, phrases, sentences, numbers, music etc.

The legends may likewise comprise the letters of the alphabet, words, phrases or sentences, numerals or muscial notation.

The legends may correspond exactly with the audio information where the lesson is one designed to teach a student to speak and read a particular language. Alternatively or in addition the legends may be expressed in one language and the audio information in another thereby to assist in teaching a student a foreign language.

Since the presence of the magnetic recording-re-play head prevents the surface of the tape readily from being seen in the vicinity thereof, preferably the legends are spaced along the length of the tape from the position on the tape at which the corresponding audio information is recorded to enable the window to be located remote from the recording-re-play head.

The window may be adjustable in position along the tape run and may also be of adjustable length (i.e. the aperture dimension parallel to the direction of movement of the tape).

There may be provided a plurality of windows so that each legend may be presented more than once. In this way for example a look, listen and say routine can be established by using the three windows in succession.

Where the audio and visual information on the tape is letters or words, a preferred linear speed for the tape is of the order of 1 inch per second. This allows each legend to be seen clearly and without strain and for speech purposes, the band width from the tape speed is found to be sufficient. Where music is involved, the tape speed should be higher and preferably a speed of the order of 2 inches per second is employed. Perferably the tape speed should be even higher but a compromise has to be found between band widths determined by the tape speed and the linear speed of presentation of the legends. It has been found that 2 inches per second tape speed is approximately the limit at which an average person can read the moving legends.

In a tape recorder for use with a tape according to the present invention, means is preferably provided for adjusting the actual linear speed of the tape through a range which includes speeds of the order of 1 inch per second. In this way a student can adjust the linear speed of presentation of legends to suit his or her particular reading ability.

A tape embodying the invention may have the legends applied thereto by printing or typewriting or stencilling or etching or any other form of marking including photographic development of a suitable light sensitive surface layer applied to the tape. Tapes can be obtained in a variety of colours but it has been found that white legends on a grey or black tape are most easily read.

Preferably the legends are applied to the conventionally shiny outer surface of the tape and are not applied to the magnetisable surface.

Where the tape is only printed on one side, only one recording track can be employed. Since on most tapes there is room for at least one other recording track, magnetic head means may be provided in addition to the re-play head in a tape recorder adapted to receive tapes according to the invention, whereby the student can separately and independently record via a microphone onto the second track as part of the lesson.

Means may be provided for illuminating the tape at the window or windows either from behind or in front depending on the colour and general transparency of the tape and the manner in which the legends have been applied thereto. Where the illumination is from below, a further method of applying the legends comprises perforating the tape to form the outlines of the letters or numerals making up the legends.

Since the tape traverses from one reel to the other in a cassette with its plane perpendicular to the upper and lower housing walls forming the cassette, the invention provides means for orienting the tape so as to present the surface bearing the legends at a convenient angle for viewing which is typically parallel or substantially parallel to the upper housing wall of the cassette. This involves twisting the tape through an appropriate angle of the order of 90° before and after it passes window.

Conveniently optical magnifying means may be provided at the viewing station for presenting an enlarged image of the legends as the tape moves therebelow.

The window may be located so as to present legends from right to left or in order to accommodate tapes bearing Chinese and similar language legends, the orientation of the viewing station may be such that the tape is caused to move effectively either upwardly or downwardly relative to the viewer to present the legends in the correct sequence.

Figure 2:
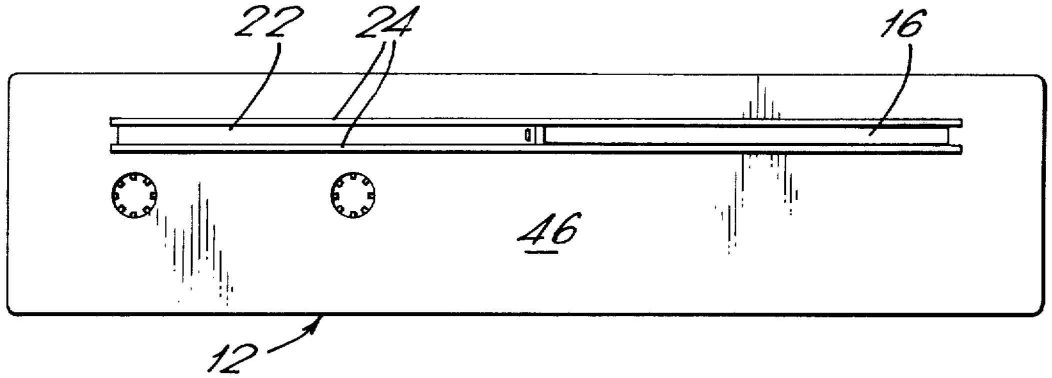
Figure 3:
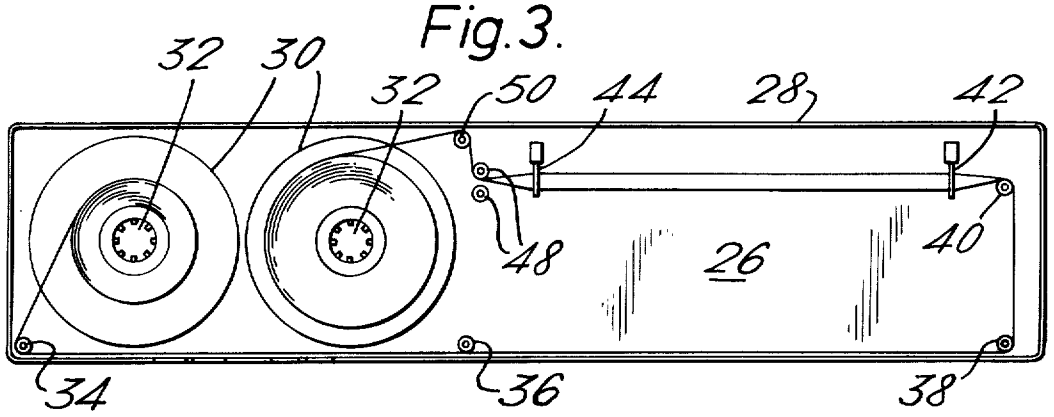
Figure 4:
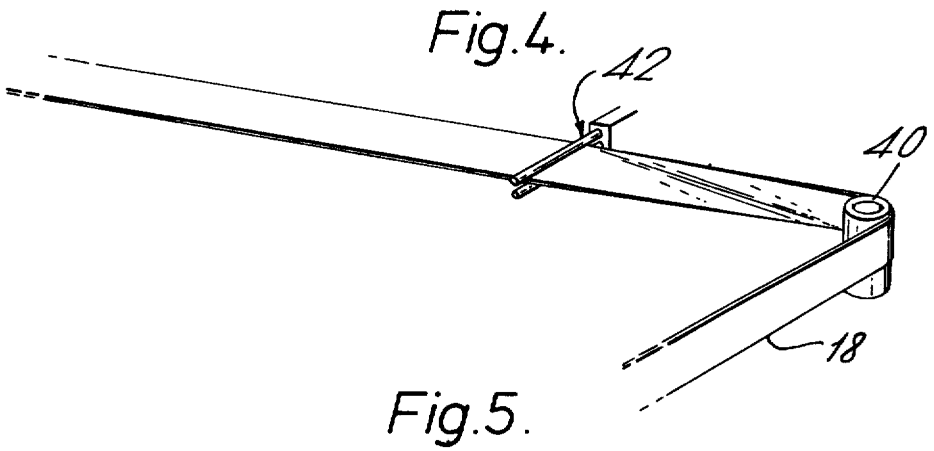
Figure 5:
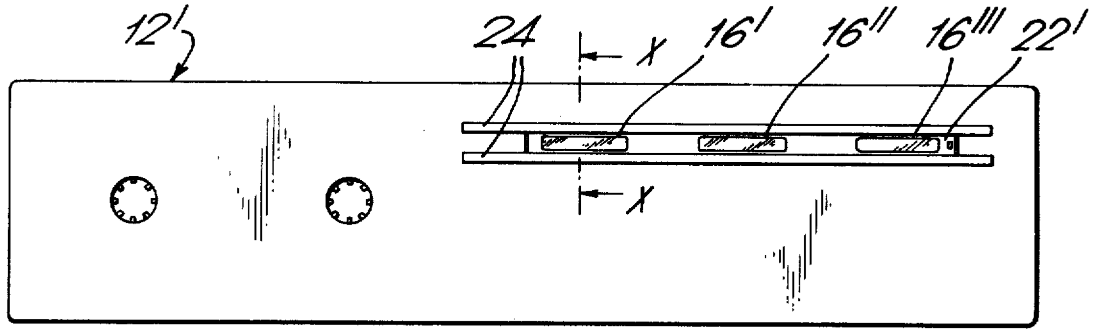
Figure 6:
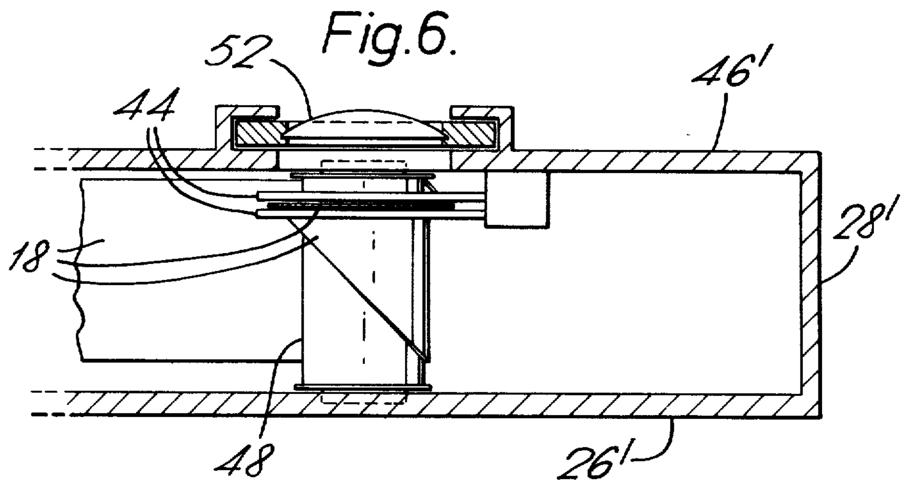
Figure 7:
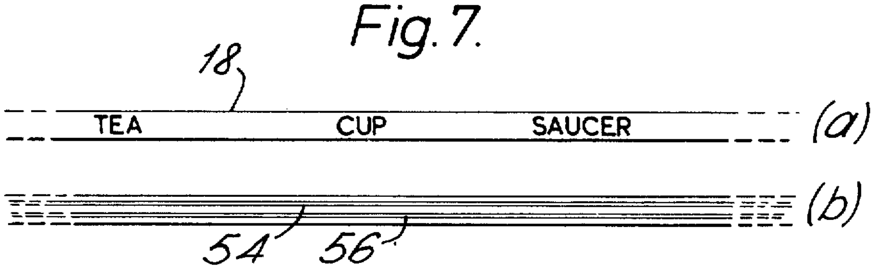

The invention will now be described by way of example with reference to the accompanying drawings in which:

FIG. 1 illustrates a cassette tape recorder and a cassette including a one-window viewing station and a tape having legends thereon which can be read through the window of the viewing station, FIG. 2 is a plan view of the modified cassette of FIG. 1, FIG. 3 is a plan view of the cassette of FIG. 2 with the top plate removed, FIG. 4 is a perspective view not to scale showing how the tape can be twisted to present one surface in the viewing window, FIG. 5 is a plan view of another modified cassette incorporating a three-window viewing station, FIG. 6 is an enlarged cross-sectional view on the line XX of FIG. 5, FIG. 7 (*a*) and (*b*) illustrates a tape constructed in accordance with the invention.

Referring to FIG. 1 a cassette recorder 10 includes a parallel-sided recess into which either a conventional cassette (not shown) or a modified cassette such as 12 can be fitted. In known manner drive is transmitted to the two tape reels (not shown) within the cassette 12 via splined spigots 14.

The modified cassette is some two to three times the length of a conventional cassette and in the extended portion thereof contains a viewing window generally designated 16 through which one surface of the tape 18 can be seen on which are formed words as shown at 20. The length of the viewing window 16 can be adjusted by sliding a cover plate 22 from left to right as shown in FIG. 1. The plate 22 is retained between two parallel guides 24.

A plan view from above of the cassette alone is shown in FIG. 2. The internal construction of the modified cassette is shown in FIG. 3. The cassette includes a lower plate 26 and a peripheral wall 28. The plate and wall together combine to form a shallow housing within which in known manner two tape reels 30 are located having internally toothed wheel centres as denoted at 32 for engaging on the splined spigots 14 (see FIG. 1) of the cassette recorder. Tape from the left hand reel of FIG. 3 traverses around a first post 34, a second post 36, a third post 38 and a fourth post 40 after which it is twisted by being passed through a horizontally orientated two-pronged fork 42. The prongs of the fork 42 extend perpendicularly to the axis of the post 40. The tape between the fork 42 and a second two-pronged fork 44 is presented for visual inspection with the non magnetisable surface of the tape uppermost. The position of the tape between the two forks 42 and 44 is made to register with the viewing window 16 formed in the upper plate of the cassette 46.

Beyond the second fork 44, the tape is twisted back to its original orientation between a pair of nip rollers 48 and after passing round a further post 50 the tape is taken up on the right hand reel.

The components required to produce a twist as required in the cassette, is shown in FIG. 4. This comprises the post 40 and first two-pronged fork 42 of FIG. 3 to an enlarged scale. The twist shown in FIG. 4 causes the inner surface of the tape (which is the shiny surface of a tape contained within a cassette) to be visible in the viewing window 16.

Although not shown the post 40 preferably includes top and bottom radial flanges to prevent the tape 18 from slipping axially upwardly or downwardly on the post. Furthermore, although not shown, the post is preferably a freely rotatable member to reduce friction between the tape and the post.

As shown in FIG. 5, the viewing station may include more than one window and in FIG. 5 three windows are shown. In the design shown in FIG. 5, the three windows 16', 16'' and 16''' are all formed in an elongate plate member 22' which slides between guides 24. Adjustment of the three windows relative to the tape (not shown) can therefore be effected by sliding the plate relative to the guides until correct registration is obtained.

Although not shown, each of the windows 16', 16'' and 16''' may be separately formed in a separate plate member and all three plate members are separately adjustable relative to the tape and to themselves for further registration adjustment.

Again although not shown, the actual linear extent of each window 16', 16'' and 16''' may be adjustable by means of further plate means (not shown) for blanking or exposing part of each window 16', 16'' and 16'''.

The cross-section on the line XX of FIG. 5 is shown in greater detail and to enlarged scale in FIG. 6. Here the tap 18 is twisted from the horizontal position which it occupies whilst traversing under the three windows 16', 16'' and 16''' back to the position in which the plane of the tape is perpendicular to the plane of the cassette.

Although not shown in FIG. 5, tape 18 passes between the two prongs of a two-pronged fork 44 as shown in FIG. 3, and thereafter is twisted before it is passed around a rotatable post 48 forming one part of a pair of nip rollers the other of which is not shown in FIG. 6. The tape then extends from the nip rollers to a take-up spool (not shown).

In order to enlarge the legends carried by the tape, a magnifying glass is fitted in each window 16', 16'' and 16'''.

FIG. 7 illustrates a tape constructed in accordance with the invention. In FIG. 7(*a*) the non-magnetised surface of the tape is shown formed with a series of words which are successively presented in the viewing window 16 of the cassette 12 of the cassette shown in FIGS. 1 to 3. The reverse side of the tape is shown in FIG. 7(b) and diagrammatically two recording tracks 54 and 56 have been denoted thereon by parallel lines. One track 54 has recorded thereon the audio information required by the invention. The other track 56 is a spare track and if the additional recording and re-play facilities are provided on the tape recorder, this second track 56 can be used to record a student's attempt at pronouncing each word contained on the tape.

The recorded information on the tape and the printed legends on the reverse side are staggered by an amount just equal to the time lag between the appearance of a sound during re-play and the corresponding legend in the viewing window. The two are arranged to occur simultaneously or with a particular time interval so as to produce particular effects. Thus for example the position of the window can be adjusted so as to cause the word to be heard before it is seen or vice versa.

By using excessive spacing between words on the tape, the three windows proposed in FIG. 5 can be used so that each word will be seen three separate times, in the viewing windows in succession.

I claim:

1. In combination a magnetic recording tape having audio information recorded thereon and having applied to one side thereof legends corresponding to the recorded information for visually representing the information as the sounds thereon are heard during playback, a cassette, two reels within the cassette for containing and taking up the tape respectively the two reels being sandwiched between upper and lower housing walls, at least one window formed in the upper housing wall and guide means in the housing for causing the tape to be stretched below the window whereby the legends on the tape can be seen through the window as they pass therebelow during transition of the tape from one reel to the other.

2. A magnetic recording tape and cassette therefor as set forth in claim 1 in which the cassette is a standard cassette having an extension at one end and the viewing window is located in the extension of the cassette.

3. A magnetic tape and cassette therefor as set forth in claim 2 in which the window is adjustable in position along the tape run.

4. A magnetic tape and cassette therefor as set forth in claim 3 in which the dimension of the window parallel to the direction of movement of the tape is adjustable to alter the size of the opening through which the legends can be seen.

5. A magnetic recording tape and cassette therefor as set forth in claim 1 in which there are a plurality of separate windows so that a single legend is presented visually more than once.

6. A magnetic recording tape and cassette therefor as set forth in claim 1 further comprising means for illuminating the tape at least below the said window.

7. A magnetic recording tape and cassette therefor as set forth in claim 1 further comprising optical magnifying means in the window for presenting an enlarged image of the legends as the tape moves therebelow.

8. A magnetic recording tape and cassette therefor as set forth in claim 1 in which the guide means twists the tape through an angle of at least 45° before it passes below the window and through the same angle but in the opposite direction after it has passed below the window.

* * * * *